United States Patent [19]

Linmans

[11] 4,009,070

[45] Feb. 22, 1977

[54] DEVICE FOR LABELLING OBJECTS ON TWO SIDES

[75] Inventor: René Maurice Linmans, Eindhoven, Netherlands

[73] Assignee: U.S. Philips Corporation, New York, N.Y.

[22] Filed: Dec. 2, 1975

[21] Appl. No.: 637,069

[30] Foreign Application Priority Data

Feb. 12, 1974 Netherlands ...................... 7415665

[52] U.S. Cl. ............................... 156/559; 156/566; 156/572; 156/DIG. 3; 156/DIG. 26

[51] Int. Cl.[2] ........................................ B32B 31/00

[58] Field of Search ..... 156/559, 566, 572, DIG. 3, 156/25, 26

[56] References Cited

UNITED STATES PATENTS

| | | | |
|---|---|---|---|
| 1,543,153 | 6/1925 | Day | 156/559 |
| 1,873,967 | 8/1932 | Klute | 156/559 |
| 2,512,579 | 6/1950 | Long | 156/559 |

*Primary Examiner*—Douglas J. Drummond
*Attorney, Agent, or Firm*—Frank R. Trifari; David R. Treacy

[57] ABSTRACT

A device for labelling objects, notably cassettes, on two sides. The device is provided with two magazines for labels and a device co-operating therewith for removing and transporting the labels to stations in the device which are adapted to receive the objects to be labelled. At least one feeding device for the objects to be labelled is provided to feed the objects to a track along which they can be moved to the said stations. At the area of the said stations the track is provided with positioning means for the objects. Between these two stations a turnover device is provided which comprises a completely or partly closed window which is arranged to transverse to the track. This window has an inner circumference which at least substantially corresponds to the outer circumference of the objects in a direction transverse to the track, and is situated in the track such that the objects can slide through the window during their movement over the track. The window is connected to a device which is adapted to move the window completely outside the track in a direction transverse to the path. Subsequently the window is rotated through an angle of 180° thereby, and finally the window is returned to the track again.

2 Claims, 6 Drawing Figures

DEVICE FOR LABELLING OBJECTS ON TWO SIDES

Figure 1:
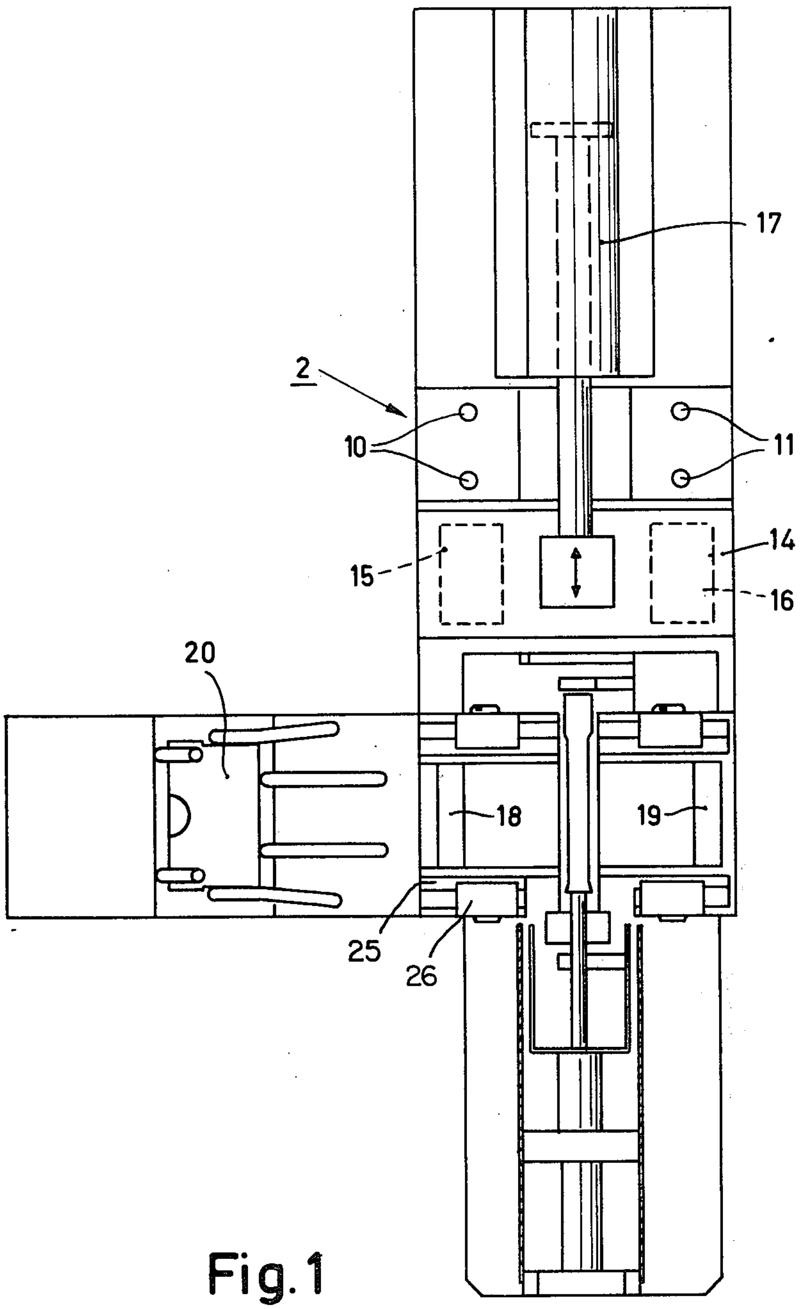

The invention relates to a device for labelling objects, notably tape cassettes, on two sides, the said device being provided with two magazines for labels and a device co-operating therewith for removing and transporting the labels to stations in the device adapted to receive the objects to be labelled.

In known devices of the kind set forth the objects to be labelled are supplied to the said stations either by hand or mechanically.

Drawbacks of the known machines are the fact that they cannot label the objects on two sides, their comparatively low operating speed, and the comparatively high inaccuracy of the positioning of the labels on the object. Notably tape cassettes require a high degree of accuracy for positioning the labels in view of the openings for the passage of the recorder shafts and in view of the fact that the labels are usually provided on the cassettes in a recorded manner.

The invention has for its object to provide a labelling device in which the cassettes are mechanically transported along the labelling stations where they are provided with labels on both sides, the device operating at a high speed and with a degree of accuracy.

In order to realize this object, the device according to the invention is characterized in that there is provided at least one feeding device for the objects to be labelled which feeds the objects to a track along which the objects can be transported to the said stations, the said track being provided at the area of the said stations with positioning means for the objects, a turn-over device being arranged between these two stations, the said turn-over device comprising a fully or partly closed window which is arranged transverse to the direction of the track and which has an inner circumference which at least substantially corresponds to the outer circumference of the objects in a direction transverse to the track and which is situated in the track such that the objects can slide through the window when transported over the track, the said window being connected to a device which is adapted to move the said window completely outside the track in a direction transverse to the track, to rotate it subsequently through an angle of 180°, and to return it subsequently to the track again.

In a further preferred embodiment, the window is connected to a reciprocatable rod which is journalled to be translatable but not rotatable in a hollow shaft, which shaft can alternatively perform a 180° rotation counter-clockwise and clockwise.

A device is thus obtained in which labels and objects merely have to be placed in the relevant magazines by hand, after which the labelling of the objects on two sides is mechanically performed at a high speed and a high degree of accuracy.

The construction and the operation of the device according to the invention will be described in detail hereinafter will reference to the drawing.

FIG. 1 diagrammatically shows the set-up of a labelling machine for cassettes.

Figure 2:
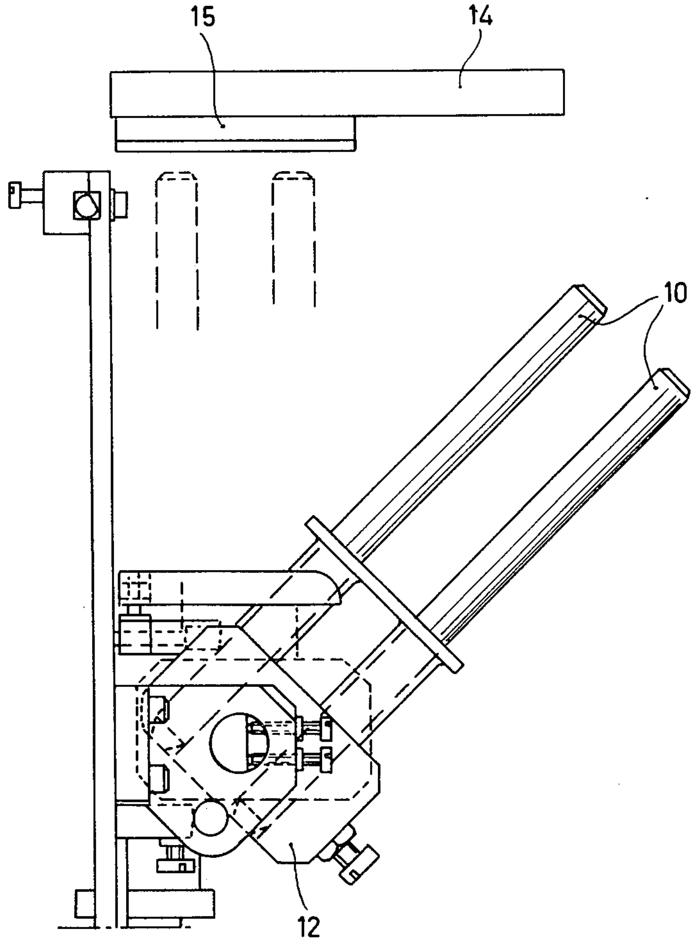
Figure 3:
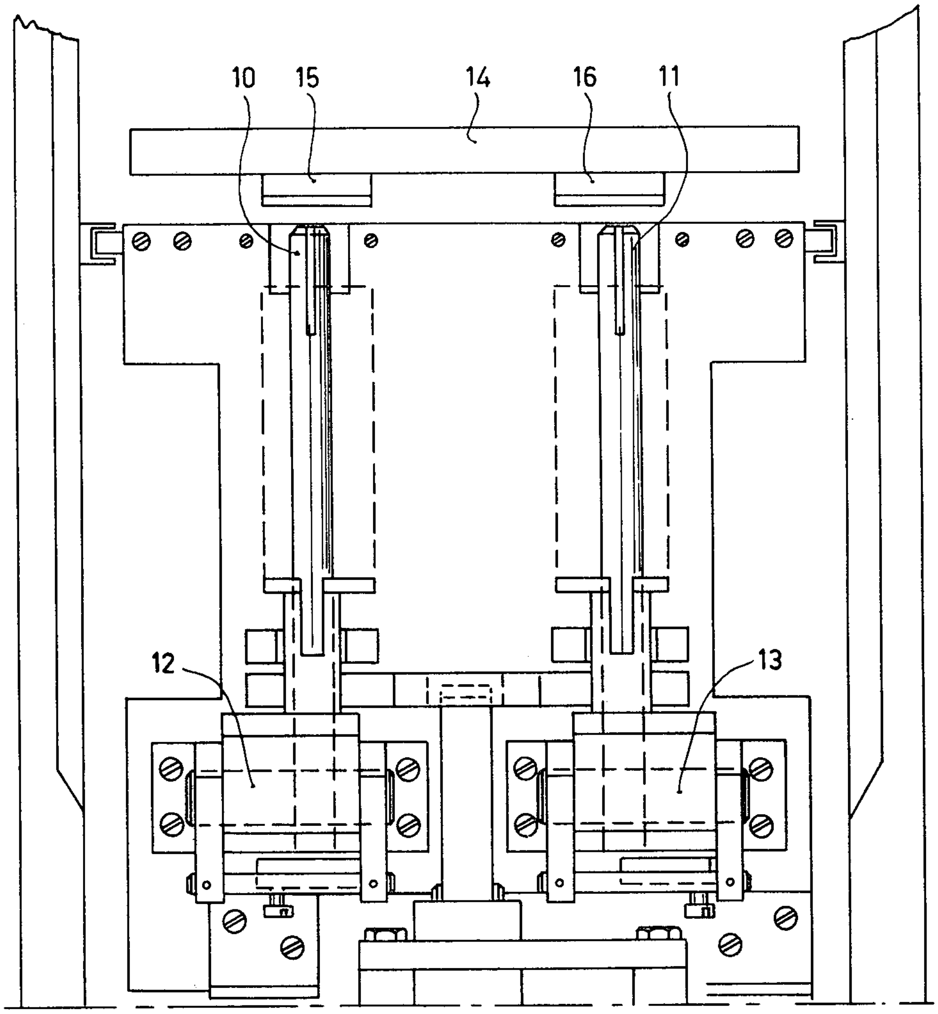

FIG. 2 and 3 diagrammatically show the label magazine in a side elevation and a front view, respectively.

Figure 4:
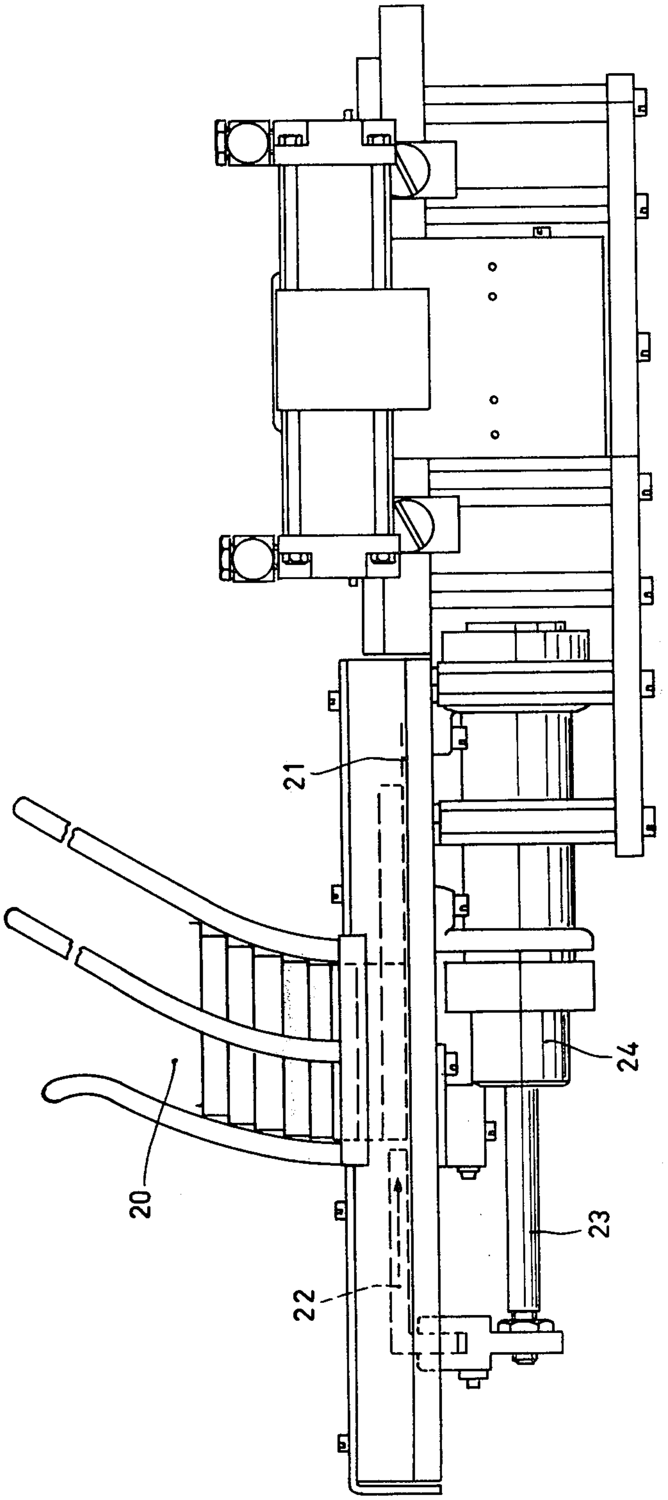
Figure 5:
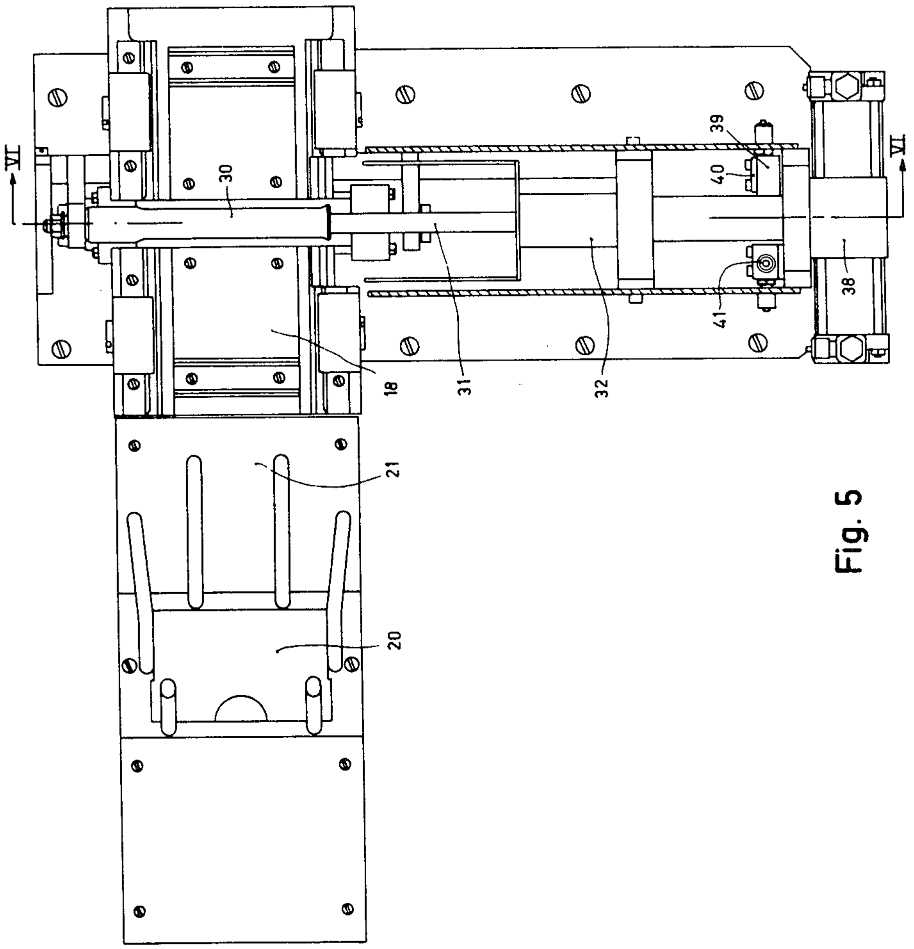

FIGS. 4 and 5 diagrammatically show the cassette transport device, the labelling stations and the turn-over mechanism.

Figure 6:
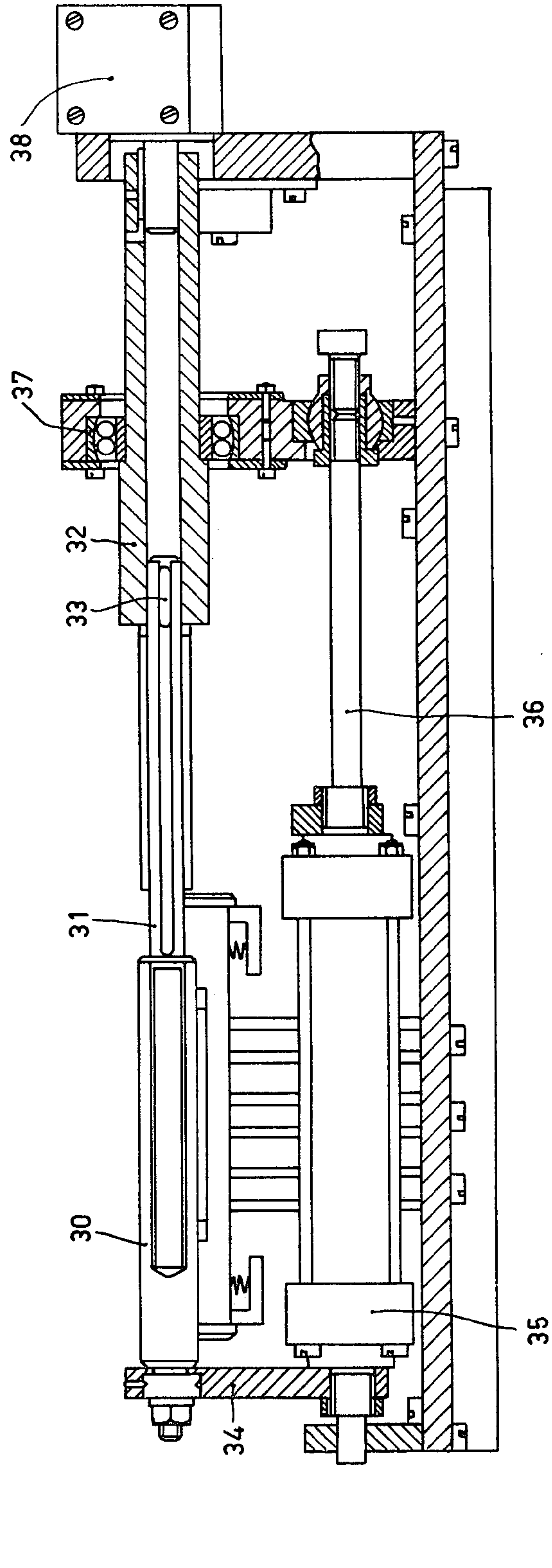

FIG. 6 is a diagrammatic cross-sectional view of the turn-over mechanism.

The cassette labelling machine shown in FIG. 1 comprises the following principal parts which are diagrammatically shown.

The label magazine, denoted by the reference 2, comprises four pair-wise arranged pins 10 and 11. On the pins 10 the labels, provided with an elongated hole, for the one side of a cassette can be stacked, whilst the labels for the other side, also provide with an elongate hole, can be stacked on the pins 11. The construction of the label magazine is shown in detail in the FIGS. 2 and 3. These Figures show how the pins 10, 11 are arranged on blocks 12 and 13 which can be tilted to facilitate the application of a stack of labels.

Arranged over the pins 10 and 11 is a slide 14 of a label transport mechanism. The slide is provided with two suction pads 15 and 16, each of which is adapted to remove a label from the relevant stack by way of a partial vacuum. A pneumatic cylinder 17 provides the sliding of the slide 14 until it is over the labelling stations 18 and 19. When the slides arrives in this position, the partial vacuum is removed and the labels are released.

The feeding and transporting mechanism for the cassettes is shown in the FIGS. 4, 5 and 6.

This mechanism comprises a cassette magazine 20 in which the cassettes are stacked by hand. Arranged below this magazine is a track 21 on which the cassettes can be slid. Sliding is effected by a pusher 22 which is connected, by way of a rod 23, to a pneumatic cylinder 24 which repeatedly causes the pusher to make a stroke which substantially corresponds to the dimension of a cassette in the track direction.

The track is proportioned such that after an integral number of steps a cassette reaches the first labelling station 18. This station comprises cassette positioning means which are in this case formed by a shallow slot 25 having inclined walls. A raised portion provided on the cassette fits in this slot, so that the position of the cassette is accurately defined. In order to prevent the cassette from leaving the slot, two spring-loaded pawls 26 are provided on the side of the track to press on the top side of the cassette.

The label supplied by the slide 14 and suction pad 15 is then released and is accurately positioned on the cassette. A pressing device not shown properly presses the label down.

The pusher 22 subsequently completes a next stroke and all cassettes are advanced one step. A further cassette then arrives at station 18, and the cassette provided with a label on one side arrives in the turn-over device. This device comprises a window frame 30, having a window opening the circumference of which corresponds to the circumference of the cassette viewed in a direction transverse to the track. The lower side and the two sides of the window opening are then level with the lower side and the sides of the track, respectively. This means that the cassette is moved from station 18 into the opening of the window frame 30 when the cassettes are advanced.

The window frame 30 is connected to a rod 31 which is journalled to be translatable in a hollow rod 32 and which is locked against rotation by a wedge 33. The rod 31 is furthermore rotatably journalled in structural part 34 which is rigidly connected to a cylinder 35 which is slidable on a shaft 36 which is rigidly journalled in the machine frame. On this shaft 36, inside the cylinder 35, there is provided a piston (not visible) so that air supplied to either side of this piston causes the cylinder 35 to move.

The hollow rod 32 is journalled to be rotatable at the area 37, and is connected to a device 38, which may be any rotation mechanism known in the art, capable of at least 180° movement, and reverse, such as a rotary solenoid or a geared motor, which is adapted to rotate the rod counterclockwise or clockwise. In order to restrict the rotation of the rod 32 to 180°, the rod is provided with a wing 39 which co-operates with two abutments 40 and 41. The turning over of the cassette is effected as follows. First the cylinder 35 is moved to the right as viewed in FIG. 6) by compressed air until the window frame with cassette held therein is completely away from the track. Subsequently, the rod 32, and hence also the rod 31 and the window frame 30 connected thereto, is turned through an angle of 180° by way of device 38. Subsequently, the cylinder 35 is moved to the left again by compressed air.

Meanwhile, the cassette in station 18 has been provided with a label, so that subsequently a next step forward can be made. The cassette is then slid from station 18 into the window 30. The cassette in window 30 advances to the station 19 which is constructed in the same manner as the station 18, so that the cassette is again accurately positioned therein. Via transporting device 14, the cassette in station 19 can be provided with a label on one side during the next operation, while simultaneously the cassette in station 18 can be provided with a label on the other side.

Upon the next step forward, the cassette provided with labels on both sides will be moved out of station 19 and will be ejected from the device via a discharge chute.

A fully mechanized device is thus obtained which is capable of labelling cassettes on both sides very quickly and with a high degree of accuracy. Even though the described embodiment relates to tape cassettes, it will be obvious that the device can also be used for labelling other objects of suitable dimensions.

In the embodiment shown, use is made of a cassette magazine 20 for feeding the cassettes. In given circumstances it is alternatively possible to feed the cassettes in a different manner, for example, by way of a transport belt which deposits the cassettes on the track 21.

What is claimed is:

1. A device for labelling objects, such as tape cassettes, on two sides, the device being provided with two magazines for the relevant labels and means co-operating therewith for removing and transporting the labels to stations in the device adapted to receive the objects to be labelled, characterized in that the device comprises at least one feeding means for the objects to be labelled for feeding the objects to a track along which the objects can be transported to the stations, said track at the area of the stations comprising positioning means for the objects; a turn-over device arranged between these two stations, said turn-over device comprising a frame having a fully or partly closed window opening which is arranged transverse to the direction of the track and which opening has an inner circumference which at least substantially corresponds to the outer circumference of the objects in a direction transverse to the track, the frame being arranged in the track such that the objects can slide through the window when transported over the track, and means for moving the frame completely outside the track in a direction transverse to the tracks, rotating the frame through an angle of 180°, and returning the frame subsequently to the track.

2. A device as claimed in claim 1, characterized in that the means for moving the frame comprises a rod connected rigidly to the frame and rotatably connected to a reciprocatable slide, said rod being journalled to be translatable but not rotatable in a hollow shaft, and means for alternately rotating the hollow shaft 180°.

* * * * *